United States Patent [19]

Laing et al.

[11] Patent Number: 4,710,100
[45] Date of Patent: Dec. 1, 1987

[54] WIND MACHINE

[76] Inventors: Oliver Laing; Johannes L. N. Laing, both of 4461 Ocean Blvd., Apt. 54, San Diego, Calif. 92019

[21] Appl. No.: 611,464

[22] Filed: May 17, 1984

[30] Foreign Application Priority Data

Nov. 21, 1983 [CH] Switzerland .................. 6242/83

[51] Int. Cl.$^4$ ............................ F03B 7/00; B63H 5/08
[52] U.S. Cl. ...................................... 416/11; 416/121; 416/142; 416/DIG. 6; 60/398; 417/62
[58] Field of Search ............... 60/398; 416/121 A, 11, 416/142 B, DIG. 6; 417/62; 52/40, 148; 290/55; 212/253

[56] References Cited

U.S. PATENT DOCUMENTS

| 943,000 | 12/1909 | Busby | 416/121 A |
| 1,247,520 | 11/1917 | Fessenden | 60/398 X |
| 1,523,342 | 1/1925 | Hart | 417/62 |
| 2,784,556 | 3/1957 | Perdue | 60/398 |
| 4,449,053 | 5/1984 | Kutcher | 416/142 B X |

FOREIGN PATENT DOCUMENTS

| 2620862 | 11/1977 | Fed. Rep. of Germany | 416/DIG. 6 |
| 893828 | 11/1944 | France | 416/121 A |

Primary Examiner—Robert E. Garrett
Assistant Examiner—Mark A. Williamson
Attorney, Agent, or Firm—Pennie & Edmonds

[57] ABSTRACT

The wind machine has at least two rotors fixed to a tower. The tower is rotatably supported by a foot bearing at its base and a second bearing positioned below a horizontal stud which supports a pair of rotor units. The second bearing is supported by guy wires and the rotor units can pivot about the stud axis. The wind machine is used to drive a pump and a plurality of wind machines can drive pumps in series or in parallel.

12 Claims, 10 Drawing Figures

FIG. 1
FIG. 2
FIG. 4
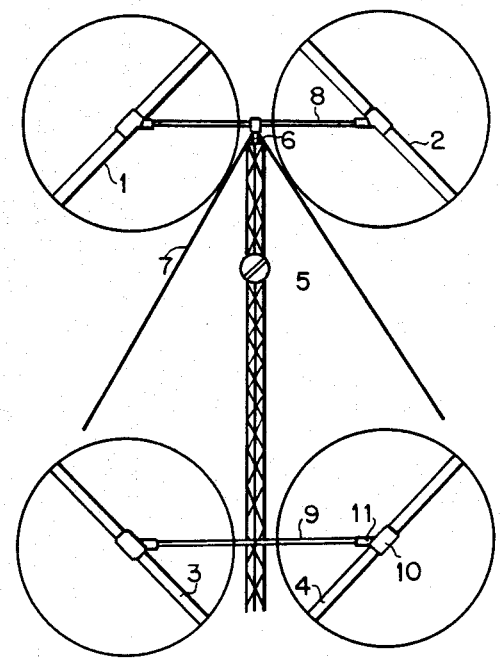
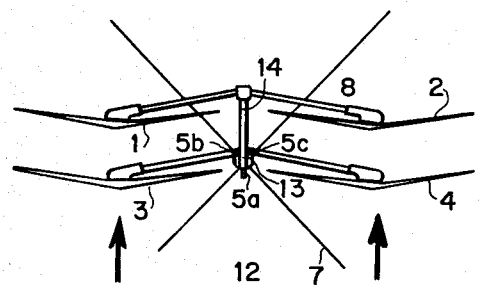
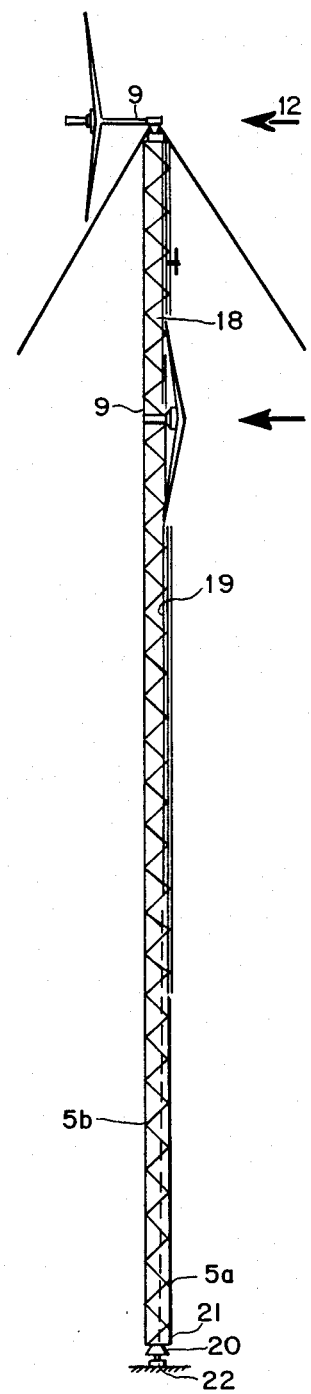

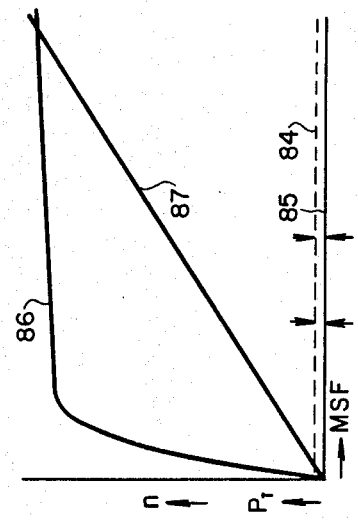
FIG. 8
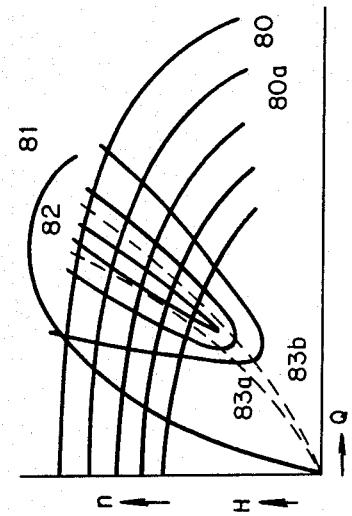
FIG. 9
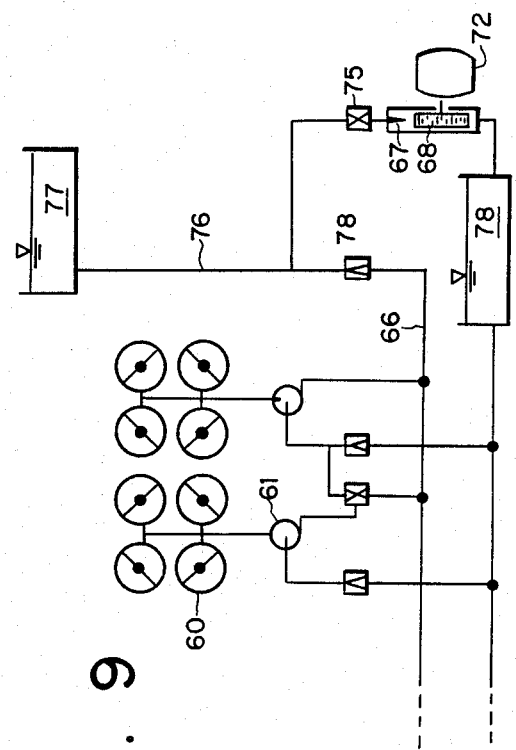

WIND MACHINE

The present invention relates generally to wind machines to convert wind energy into other forms of mechanical or electrical energy.

In addition it relates to means for storing mechanical energy.

BACKGROUND

Wind turbines are used to produce electricity. The trend goes to units with a large rotor diameter. The Growian in Germany has a diameter above 100 meters. The new largest concept goes up to 175 meters. It turned out that production costs for this kind of wind electricity energy generators are so high that the period of amortization is longer than the expected life time of the machine.

The invention shows a way to produce electricity in an economical way.

The invention shows, how powerful wind machines can be made without large rotors. The solution is a multi-rotor tower. If conventionally designed wind turbines are analyzed, it is apparent that all types have some common disadvantages than can be eliminated by using small rotors. The following compares conventional 54-ft diameter wind turbines and multi-rotor turbines with four rotors of one half the diameter. The diameter of 54-ft was chosen because more than 3,000 wind machines with this rotor diameter have already been sold. In contrast to that trend it can be proven, that large rotors show much higher cost per KW than a group of small rotors together having the same total swept area and performance. Transformation of wind power into mechanical performance takes place within the plane of the rotor, therefore the rotor is the most important element of any wind turbine.

A rotor assembly consists of the rotor hub and blades. In the case of a rotor without pitch control, which shall be compared in this case, about 80% of all costs are within the blades. The price of blades with the same mechanical properties depends on their size. Material costs are proportional to weight. The weight of a blade follows the equation:

$$G = G_o \cdot L^3$$

L = Length of blade

When comparing the two rotor systems, this equation shows a weight ratio of 8:1. Four small rotors produce the same energy as one large rotor. Therefore, material cost for four small rotors is only 50% of the material cost for one large rotor. The real savings are considerably higher because the production of one large rotor needs much more investment for jigs, tooling and labor than production of four sets of blades for small rotors. Therefore, also investment for production means and labor costs lie far below comparable costs for large rotor and blade assemblies.

The invention shows, how powerful windmachines can be made without using large rotors. The solution is the use of a multi-rotor tower.

Upwind rotors are exposed to the undisturbed air stream. The costs of upwind turbines are higher than for downwind turbines because the upwind machines require sensitive high torque servo drive means for the heavy duty yaw control bearing systems. The disadvantage from the engineering standpoint is the fact that, as each blade crosses the front of the tower, cyclic forces excite cyclic vibrations causing fatigue in the tower structure. Therefore, upwind type tower construction requires more material. The engineering advantage of downwind wind turbines is that they do not require mechanical means for yaw control, however, the blades crossing the wind shadow of the tower, undergo extreme cyclic excitations. This is one of the main causes for blade distruction by fatigue.

The multi-rotor system according to the invention combines the advantages of upwind turbines, e.g., the undisturbed wind stream, with the advantage of the downwind turbines, e.g., the automatic yaw control—without the above described disadvantages of single rotor wind turbines.

Gyroscopic Forces

These forces, which are generated if the blades are pivoted out of the plane of rotation, follow the equation:

$$M = \omega_f \omega_{rotor} W \cdot l^2$$

$\omega_f$ = Angular velocity
W = Weight of blade  l = Length of blade

This equation shows that the gyroscopic torque for the 54-ft rotor with eight times higher weight, twice the length and half the speed of rotation is 16 times larger than for the 27-ft rotor. In addition, by counter rotation of the rotors of the multi-rotor version, no gyroscopic torque reaches the tower.

Blade Vibration

Cyclic excitation generates vibrations with increasing amplitude, if the excitation coinsides with one of the coinciding harmonics of the blade. A rotor blade mechanically forms a cantilever beam which follows the equation:

$$f = E \cdot I / W \cdot 1/l^2$$

f = frequency
I = Moment of inertia

This indicates that the frequency of the fundmental resonant decreases with increasing blade length and weight. Critical resonances are not only caused by the fundamental resonance frequency, but also by harmonic frequencies, therefore the possibilities of critical excitations increase with blade length and blade weight.

INFLUENCE OF GRAVITY AND MOMENT OF INERTIA

The bending forces acting on the blades of a horizontal axis wind machine are considerably larger than the forces of vertical axis helicopter blades, because the blade in the lowest point of travel is loaded in addition to its relatively low centrifugal force by strain, caused by the weight of the blade, and lift forces, generated by the wind stream.

When the blade reaches the horizontal position, the moment of flexure follows the equation:

$$M_{fl\,up} = W \cdot D - TRQ/z$$

W = Weight of blade
D = diameter of rotor
TRQ = Torque on shaft
z = Number of blades This moment $M_{fl}$ reaches its maximum value in the second horizontal position according to the equation:

$$M_{fldown} = W \cdot D + TRQ/z$$

At this position, both lift and gravity forces work in the same direction. The moment of inertia requires a blade of high width while the aerodynamic requirements dictate a different blade configuration. Therefore a compromise must be chosen between the production requirements and aerodynamic advantages.

Comparison

The following list shows the values of large and small rotors:

| Rotor Diameter: | 54-ft Diameter | 27-ft Diameter |
| --- | --- | --- |
| Material Weight | 8 | 1 |
| Centrifugal Forces | 4 | 1 |
| Torque | 8 | 1 |
| Performance | 4 | 1 |
| Material Cross Section | 4 | 1 |
| Section Modulus | 8 | 1 |
| Gyroscopic Moment | 16 | 1 |

Gear System

The torque of the 54-ft rotor is eight times higher than the torque of the 27-ft rotor. The 54-ft rotor additionally requires a step-up ratio twice as high as the 27-ft rotor. Material requirement for the gear and price of a gear are not dictated by performance, but by torque and step-up ratio.

Gear System Cost

The torque of a 27-ft rotor coincides with automotive axle torque, therefore the unaltered conical gears of trucks are suitable. Four conical gears, made in mass production processes, with a neutral (non-step-up) central gear, replace the very heavy and expensive gear assemblies and gear box of the conventional 54-ft wind turbine.

Noise Generation by Gear Systems

Gear noise goes up with step-up ratio, torque and roughness of the flanks of the gear teeth. In our comparison, the step-up ratio of the 27-ft rotor decreases by 50% and torque decreases by 88%. Small conical gear systems made by automotive high precision processes are practically noiseless, while the gear box of the 54-ft turbine produces considerable noise.

Life Expectancy of the Gear Assembly

All gear systems require lubrication between the flanks of the gear teeth. If the pressure between the flanks remains too long, the film of the lubricant is forced away and wear commences on the metal surfaces of the teeth. Large gear boxes driven by low rotor speed show higher periods of dwell, therefore wear is considerably higher than that of faster rotating gear wheels. In addition the higher precision of automotive grinding technology, optimized during the past 80 years, also contributes to maximum gear life of multi-rotor systems.

The new multi-rotor concept operates with one highly efficient central generator, instead of one generator for each rotor. Power is transmitted hydraulically using a pressurized water circuit from the rotor assembly to the central generator. Each multi-rotor wind turbine drives a rotodynamic pump with the same $P = V^3$ characteristic as that of the driving wind rotor.

This combination allows operation with the highest possible overall efficiency under all wind velocities below cut-out speed.

The performance of synchronous wind turbines with constant rotor speed coincide with the performance of the multi-rotor unit only at rated wind speed. During lower wind velocity conditions the efficiency of a frequency guided wind machine goes down rapidly. In the vicinity of cut-in wind speed, more than 70% of the rotor performance will be absorbed by avoidable aerodynamic losses of the rotor.

The multi-rotor system therefore creates under low wind velocity conditions up to *three times more* saleable energy.

During two thirds of the annual hours, wind velocity is below the rated wind speed.

The wind guided multi-rotor turbine also provides more energy than todays frequency guided wind turbines during periods with wind velocities above rated wind speed. This is because a generator burns out if overloaded, therefore break means absorb the excess part of the performance, while the new system is limited only by the permitted load of the mechanical transmission means between the rotors and a rotodynamic pump.

Centralized Electricity Generation

The losses of any electrodynamic machine like a generator, increase by cube of linear dimension $P_L \equiv d^3$, while the usable energy increases by the forth power $P_E \equiv d^4$. This is the reason, why small generators convert only 80% to 90% of rotor performance into electrical output, while generators in the megawatt range (the total performance of a whole wind farm) lose only 1.5% to 3% of energy output.

To adapt the generator to the varying performance of the wind turbines, a valve system is used enabling pressure adaption by forming groups of pumps connected in series. The losses of the transmission system are:

$$\eta_{gear} = \eta_{pump} \cdot \eta_{turbin} \cdot \eta_{generator} \sim 0.88$$

They reach a value of $\eta_{transm.} = 0.9$.

SINGLE STRESSED TOWER

The multi-rotor system permits the construction of towers with much high altitudes at given cost, because this type of tower construction requires considerably less material. The tower forms a unit with the rotor assemblies and is guyed by four cables fastened to a collar bearing located at the tower top.

Meteorological Boundary Layer

Wind produces a boundary layer, whereby the velocity on the ground is zero and increases with the distance from the ground under the law of PRANDTL. The thickness of the boundary layer depends upon the interference of the wind by all types of obstacles. Wind on the open sea has the smallest boundary layer thickness. This thickness increases considerably over forests, hills and buildings.

The performance of the air stream tube passing through the swept area of the rotor increases by the cube of the actual velocity $P \propto V^3$. Therefore, it is desired to go as high as possible in order to get maximum wind velocity. To calculate the most economical tower height, the following equation determines the increase of wind velocity as a function of height and turbulence exponent based on the standardized 33-ft=(10 mm) wind velocity.

The increase of velocity follows $$V = V_{33} \cdot (H/33)^a$$

H = height [ft]
$V_{33}$ = Wind velocity in 33-ft

The exponent a has in areas of low turbulence a value of a=0.16, and in areas of high turbulence a value up to a=0.4.

If the tower height doubles from 10 m (33-ft) to 20 m, the wind speed V and wind turbine performance P go up according to

| a [—] | V (increase in wind velocity) [% of 33-ft speed] | P (increase in performance) [% of 33-ft performance] |
|---|---|---|
| 0.16 | 111.7 | 139 |
| 0.28 | 121.4 | 179 |
| 0.4 | 132 | 230 |

Therefore, for determination of the most economic tower height, wind velocity as a function of the boundary layer is decisive for the tower cost.

In slope areas of hills or mountains, the lower stream tubes of the wind may undergo considerable acceleration, therefore the above boundary layer equation is not applicable for said areas. Negative shear conditions with decreasing velocity at extreme heights have even been observed. Furthermore, the convertable part of the energy content of a stream tube is always below the theoreticaly energy content caused by turbulence, because only the velocity vector parallel to the turbine axis generates torque. The degree of turbulence is a function of the distance from the ground. With increasing tower height, turbulence decreases to the advantage of conversion efficiency.

The Rotating Guyed Tower

The tower of the single rotor wind turbine represents a cantilever beam. Strain and compression forces are determined by the ratio of the tower height versus tower width. Therefore, the material used to construct the tower has to undergo tension, compressive stresses and shear stresses. The cantilever beam follows the equation:

$$\sigma = M_B/W_B$$

$\sigma$ = max. stress
$M_B$ = bending moment = $P/V \cdot H$
$W_B$ = $I/C$ = section modulus
H = tower height In addition, any tower with a top mounted yaw bearing has to resist load from all directions, therefore it has to be designed with uniform distribution of omnidirectional tensil stress and compressive load.

The multi-rotor tower is designed as a rotatable tower pivotably mounted on a support bearing and guyed by four cables fixed on a rotatably mounted bearing.

The new tower design therefore no longer conforms to omnidirectional distribution of bending forces, but forms an unidirectional system whereby the structure on the upwind side is mainly designed for tensile stress, while the downwind side is loaded with compression forces and in addition the bending resistance in wind direction is considerably higher than perpendicular to wind direction.

The rotating tower is mounted between a thrust bearing on the ground, and the collar bearing on the top of the tower. Contrary to the above equation, the new tower forms a beam supported at its ends.

In the following, the tensile forces on the tower ride, facing the wind and the compression forces on its downwind side, are compared under the same value of rotor thrust and height of the tower.

This tower experiences only compression forces. Under the same rotor thrust of P/V=4,670 lbs the maximum forces are:

$F_D$ = −6,590 lbs

The ratio of the compression forces of the conventional tower versus the rotatable guyed tower is 7:1, tensile forces of 46,700 not taken into consideration. The savings in material will be about 88%.

Foundation

A further advantage is that the multi-rotor tower has an extremely small base plate, because only vertical thrust forces of 6,590 lbs are brought to the lower end of the tower, while cantilever type towers require heavy and expensive concrete foundations, withstanding 46,700 lbs thrust and 46,700 lbs tensile forces, while the new tower is supported by a universal joint so that no bending nor tensile forces are transmitted to the tower base. In addition this design permits the tower to be tilted down to the ground for maintenance, therefore one of the cables is fixed on a winch.

The new design therefore permits extremely high towers, reaching in many cases above the boundary layer at a price equal to a normal tower for conventional wind turbines and requires only a small baseplate.

No Power Train Weight

The weight of the rotors and drive train as explained previously, lies far below the weight of the nacelle of a 54-ft rotor, having a weight from 4,100 to 5,600 lbs (depending on manufacturer), which includes the high torque gear, the generator and the brake. The weight of all the equivalent multi-rotor elements on top of the tower have a weight below 800 lbs.

The lack of a power train on the top of the tower results in a further reduction of the required tower material to about 8% of todays weight as compared with the tower material of a conventional tower with the same wind thrust.

DESCRIPTION OF THE DRAWINGS

FIG. 1 shows the design of a multi rotor wind machine with a rotatable tower and tiltable rotors.

FIG. 2 is a top plan view of the wind machine of FIG. 1;

FIG. 4 shows a side view of the wind machine of FIG. 1;

FIG. 8 shows the characteristics of pump and turbine.

FIG. 9 shows a high mountain storage arrangement.

DESCRIPTION OF PREFERRED EMBODIMENTS

Multi-Rotor Wind Turbine

Figure 3:
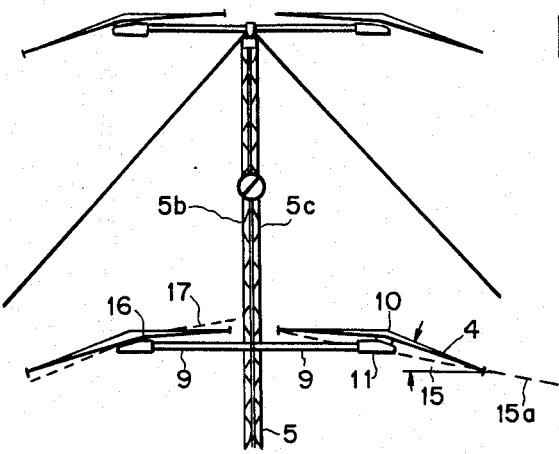
FIG. 3 shows the wind machine of FIG. 1 with the rotors in the high wind position.
Figure 5:
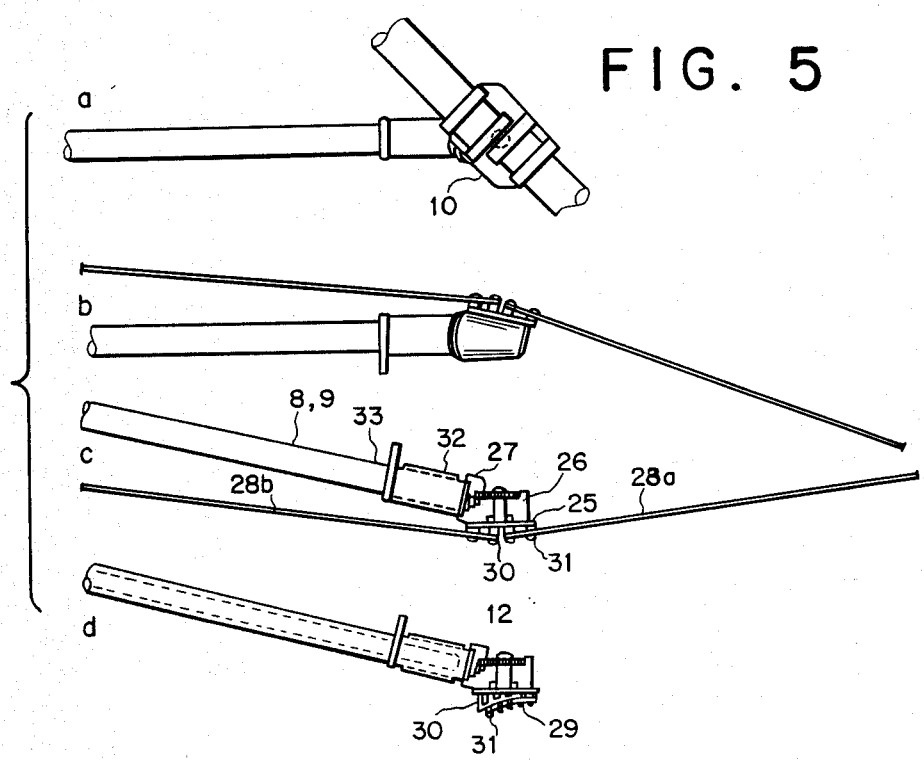
FIG. 5 shows the rotor hubs.

FIG. 1 shows the multi-rotor turbine from the upwind position. The four rotors (1-2-3-4), are interconnected by conical gear means. Rotor 1 and 4 rotate counter clockwise and 2 and 3 clockwise, so that all gyroscopic forces are fully compensated. On top of the tower (5) a collar (6) is rotatably mounted and forms the connecting element for the four cables (7). The outriggers (8) and (9) are rigidly fixed to the tower (5) and the tower itself rotates, supported by a thrust bearing on the ground plate and, held in fixed position by the collar bearing (6) at the top. The tower therefore has no bending forces on its lower end. The four hubs (10) of the rotors are pivotaly mounted on the outriggers (8 and 9).

FIG. 2 shows the same tower viewed from the top. The rotors (1 to 4) face the unobstructed wind (12), and the rotors (3 and 4) are mounted in the plane of the vertical axis (13) of tower. The outrigger (8) is connected to the top of the tower by a spar (14), therefore the planes of rotation of the rotors (1 and 2) both operate on the downwind side, nevertheless, the wind also has unobstructed access to these rotors. The loaded elements of the tower consists of the front beam (5a) and two back beams (5b and 5c). This configuration permits minimizing material weight because the front beam (5a) is loaded only by tensile forces while the two other beams are practically loaded only by compression forces.

To protect the rotors against excessive wind forces, the whole tower can be rotated by 90°. This mode is not applicable for areas where the wind direction may change within very short periods. For these regions, the rotors shall be tilted in a horizontal plane.

FIG. 3 shows the position of tilted the rotors under excessive wind velocity conditions. To prevent blade damage, the overhanging portions (11) of the hubs (10) have tilted the rotors into a nearly horizontal plane (15), so that the rotors (1 to 4) act like autogyro rotors. In this position the tip speed ratio λ goes down to about λ=0.8 so that under any wind velocity whatsoever, rpm is considerably lower than in the working position, however the stabilizing effect of rotation remains. The inclination (15) of the plane (15a) is necessary to prevent contact between the outrigger (9) and the blade of the rotor (4) during the tilting operation. The direction of rotation of the rotors are chosen in such a way so that the blade (16) heading towards the tower (5) is bent by gyroscopic forces into the position (17), i.e. away from the outrigger (9).

FIG. 4 indicates the side view of the multi-rotor turbine including the lower part of the tower. The shaft (18) connects the upper outrigger (8) with the lower outrigger (9), a second shaft (19) guided by several bearings is directly connected with a specially designed rotodynamic pump (20) at the tower base. A thrust bearing (21) is located between the pump (20) and tower (5). The whole tower is pivotaly mounted around the axis (22).

FIGS. 5a, 5b, 5c and 5d show the hub portion (10). The hub plate (25) forms a unit with the shaft (26) carrying the conical gear wheel (27). The blades (28a and 28b) are connected by bolts (29) with a spacer (30) and the cover strip (31). The tube portion (32) is pivotably mounted around the outrigger (8 or 9). Both hub portions of each outrigger have a common axis that rotates the worm gears (33) to tilt the rotors from the working position (10c) into the autogyro position (10b).

Gear Transmission

Figure 6:
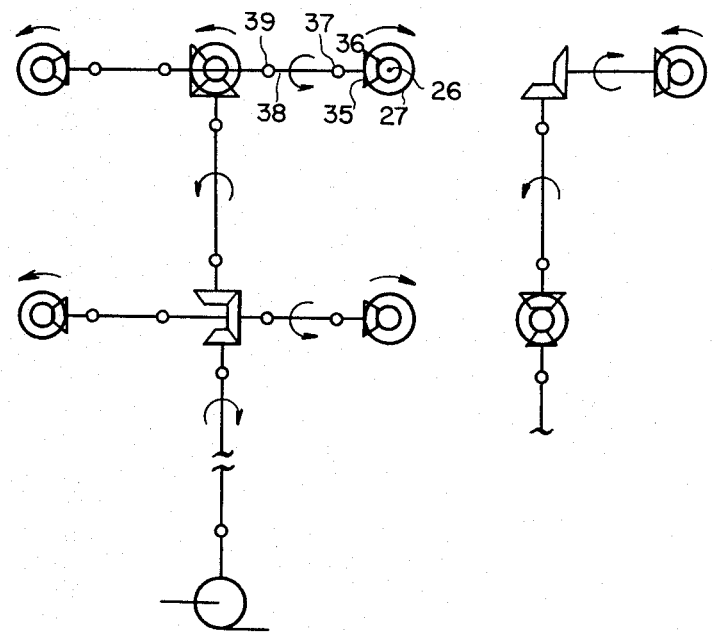
FIG. 6 shows the system of mechanical transmission.

FIG. 6 shows the principle of the gear transmission.

The shaft (26) forms a unit with the conical gear wheels (27), driving the conical wheel (35) with the bearing (36). Between the universal joints (37) a tube (38) forms the shaft to the center gear wheel (41). The gear wheel pair (41) brings the performance of the upper rotor set by the gear group (42) to the shaft (43), driving the pump (20).

Water Hydraulic Power Transmission

Figure 7:
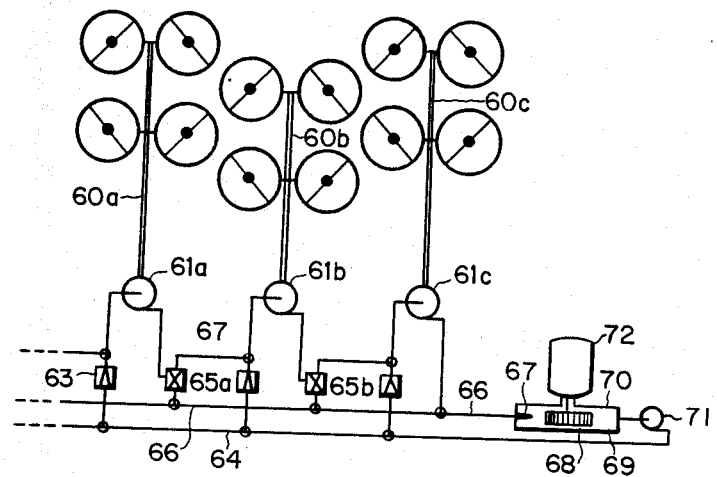
FIG. 7 shows the circuit wind turbine driven pump and pelton turbine-generator.

FIG. 7 shows the hydraulic circuit.

The wind turbines (60a and 60b, & so on) represent a multitude of any number (preferably 50 or more) wind turbines, each driving a pump (61a, 61b & so on), connected to a feed pipe (64). The suction side of each pump is connected though a check valve (63) to this feed pipe (64). The pressure side of each pump supplies pressurized water to a three way valve (65). Depending upon the chosen path, the pressure side feeds pressurized water into the pressure pipe (66) or, if the pressure is not high enough, through the connection valve (65a) into the suction side of the next pump (61b). This arrangement permits:

Parallel Operation or Operation in groups of pumps switched into series

The pressure pipes (66) feeds the nozzle (67) and a water jet with constant velocity is formed which drives the pelton turbine wheel (68), which extracts the kinetic energy of the water jet. The de-energized water falls into the sump (69) of the turbine housing (70) and is recirculated by the low pressure pump (71), which feeds the pipe (64). The turbine (68) drives the generator (72). This arrangement permits constant pressure in the pressure pipe (66) and therefore constant outlet velocity of the water jet which results in constant circumferential speed of the pelton wheel (68). This turbine (68, 70) is controlled by the frequency of the generator. The only variable is the mass flow of the water. At maximum power all pumps (61) work in parallel, the other extreme is that up to eight pumps form groups switched in series. While the wind generator rotor speed varies proportionally to wind speed, the pelton turbine drives the generator with constant rotational speed, creating AC with constant frequency.

FIG. 8 shows the head-discharge curves (80) of the rotodynamic pumps for different circonferential speeds. Curve (81) shows the efficiency characteristics. The efficiency line (82) envelops the field of maximum efficiency. The throttling curves (83a & 83b) contacting this efficiency field, indicate the specific speed interval, under which the pump may operate, working under the highest possible efficiency at any wind rotor speed.

FIG. 8 also indicates the performance curve of a pelton turbine with constant waterjet velocity. The performance curve (87) commences below the "0" power line (84) because the pelton wheel, running in air at constant speed, has a constant value (85) of ventilating losses. The efficiency curve (86) reaches 98% and only decreases in the full range of operation a few percent. Therefore, the performance curve (87) runs proportional with the mass flow MSF of the pressurized water.

These curves indicate that the combination of a group of pumps, being operated always in said throttle curve interval (83) and driving a turbine with a nearly constant efficiency curve (86) permits transmission of power between 10% and 100% with extremely small losses.

Energy Storage in Mountains

Figure 10:
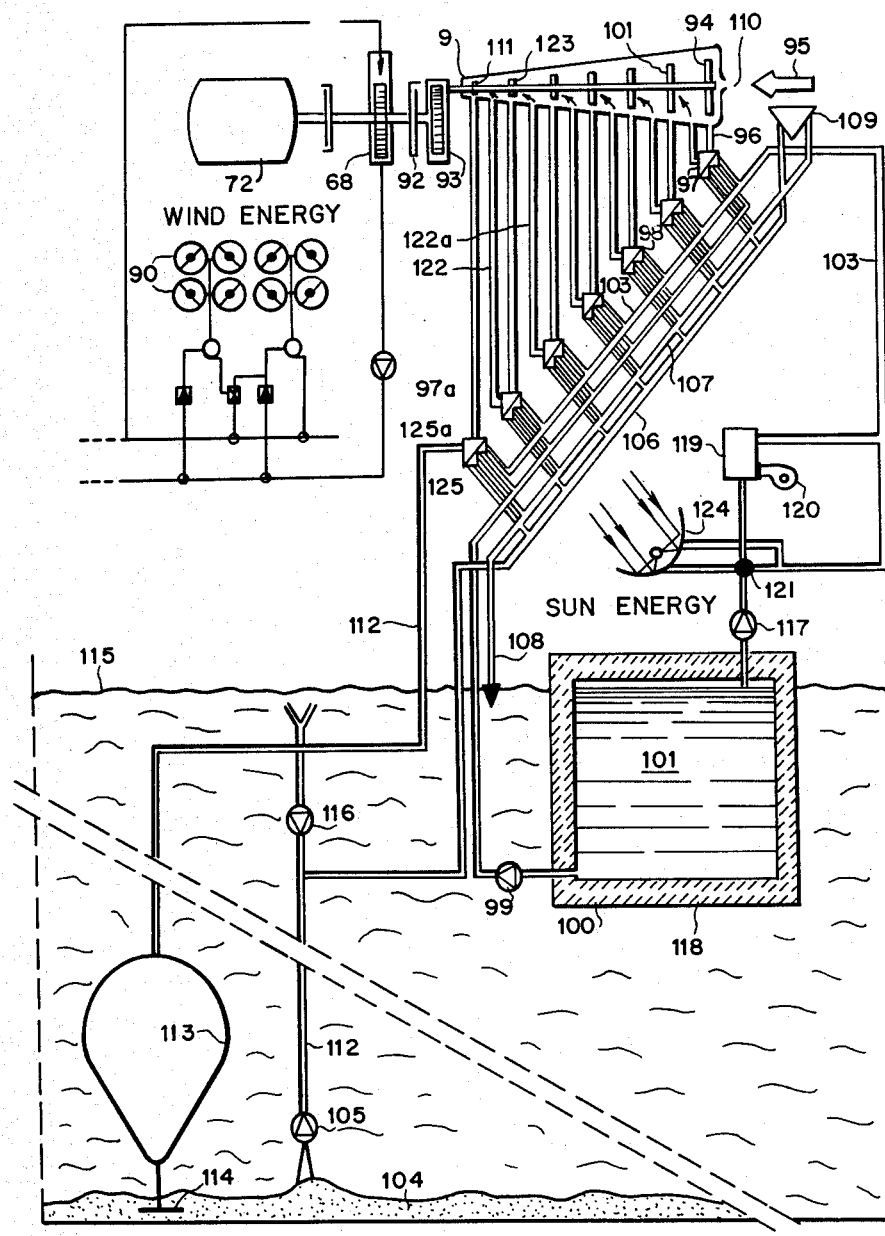
FIG. 10 shows a deep sea storage arrangement.

FIG. 10 shows the typical arrangement for storing wind energy on land. The LN wind turbines (60) with the pumps (61) feed the pressure pipe (66). If the valve (75) is closed, the pressurized water feeds through the pipe (76) a lake (77). If energy from the generator (72) is requested, the valve (75) will be opened. The check valve (78) prevents water of the upper storage lake (77) from flowing back through pipe (66), so all water, whether pressurized by the wind turbines (60) or coming from the storage lake (77) gets accelerated by the nozzle (67) driving the pelton wheel (68). The lower lake (78) has to have the same volumetric capacity as the upper lake (77). It is nearly empty, if the lake (77) is full.

The use of water stored at higher elevation for energy storage is well known and utilities make use of this system. In storage systems art, the power plant electricity drives an electric motor, this electric motor drives a storage pump to charge the upper lake. If the stored energy shall be used the stored water is guided through a turbine driving a generator. While these conventional storage systems show considerable losses by the chain of four efficiencies, the combination of water-hydraulic transmission with mountain storages creates no losses between storing and discharging except friction in the pipe (76).

DEEP SEA ENERGY STORAGE SYSTEM

The wind machines (90) drive the pelton turbine (68), producing electricity by the generator (72).

If available performance exceeds the actual energy demand, the compressor-expander machine (91) will be driven via the clutch assembly (92) and the gear box (93). The first stage (94) of this machine (91) sucks an air stream (95) and supplies compressed air through the pipe (96) into the heat exchanger (97). The heat exchanging wall extracts compression heat of the compressed air by a storage water circuit circulated by the pump (99). This water circuit communicates with a floating heat-storage container (100) filled with fresh water (101). The compression energy of each of the compressor stages (94, 102-111) causes an increase of air temperature of 74 K. The heated water is brought back into the hot water storage (101) by the pipe (103). A second circuit of heat carrier starts at the sea bottom (104) where the pump (105) provides water at deep sea temperature (that is 4° C.) to the pipe (106). Also this heat carrier circuit is connected with each of the heat exchangers (97, 98 and so on). The deep sea water cools the air of each stage further down and leaves, warmed up through the pipe (107) the system flowing back through the pipe (108) to the sea. The same 4° C. water circuit passes through the heat exchanger (109), that cools the air (95) entering the compressor on the inlet side (110). By this means, the sea forms the second energy storage for the low temperature side of the process. By this process the total compression energy can be extracted and stored in the storage (100) or partly in the open sea. In the last stage (111), the pressure of the air is brought up to a static pressure equivalent with the pressure on the bottom of the sea (104). Through pipe (112) the highly compressed undercooled air is conducted to the air storage (113), which consists of a multiple of balloon shaped plastic film containers which are anchored by anchors (114) or contain ballast by partly filling with sand.

If the demand of the grid can not be fulfilled by the wind turbine performance, the whole process will be reversed. The compressed air, having a temperature of 4° C. gets heated up by warm water taken from the sea surface (115) which is pumped through the pump (116) into the pipe (106) leaving the system through the pipe (108). Afterwards the compressed air is warmed up in the heat exchanger (125) close to the surface water temperature of the sea. The pump (117) provides hot water through the pipe (103) to the heat exchanger (125a) and therefore supplies via the valve (121) all heat exchangers (97, 98–125a) with hot water so that the compression energy produced by the stage (111) is recuperated to the compressed air in the stage (111). The temperature of the compressed air drops back to the original temperature by expansion, the air leaves the stage (111) through pipe (122) and is heated up through heat exchanger (97a) whereby again the compression energy of the next stage (123) is fully recuperated, leaving after expansion through the pipe (122a) to the next heat exchanger and so on. By this method, the full amount of stored energy is available during energy discharge (if efficiency is not considered).

The compressed air container (113) has no losses while the thermal energy storage (101) has some losses depending on the insulation properties of the wall (118). Therefore from time to time, heat has to be added. For this purpose, a boiler (119) with a burner (120) can replace the lost heat to the hot water circuit. Instead of this boiler, a solar collector (124) can provide sun energy to replace the losses. Both heat sources (119 and 124) can also be used to add heat in excess of the recuperated compression heat. In this case the system provides more mechanical energy than generated by the wind turbines during the charging phase.

The combination of wind power and solar energy is advantageous for many places in the world.

What I claim is:

1. A wind machine of the type having at least two rotor units, and a tower for supporting the rotor units and having a vertical axis, comprising:
   (a) a foot bearing for rotatably supporting the tower at a bottom end;
   (b) a stud rigidly fixed to said tower in a generally horizontal position for supporting a pair of said at least two rotor units in a position that the rotors rotate in a plane on the downwind side of the tower and are spaced horizontally;
   (c) a second bearing on said tower positioned above the lowest point of rotation of said rotor and below said stud and providing attachment for guy wires to hold said tower in an upright position rotatable about a vertical axis; and
   (d) each of said rotor units of said pair rotates in a direction opposite from the other.

2. The wind machine according to claim 1 wherein:
   (a) the rotor units are mounted to pivot about a horizontal axis aligned with said stud.

3. The wind machine according to claim 2 wherein:
   (a) a centrifugal pump is driven by said rotor unit; and
   (b) said pump pumps a liquid in a closed loop which includes a pelton turbine.

4. The wind machine according to claim 3 wherein:
(a) a group of pumps are driven by a group of rotor units and valves are provided to direct flow among a group of closed loops to maintain a predetermined pressure in the loops.

5. A wind machine according to claim 1 characterized by the wind machine driving a centrifugal pump to produce pressurized water.

6. A wind machine according to claim 5 forming a part of a group of wind machines with a pump the suction side of which is connected with a feed pipe over a check valve between the feed pipe and the suction side and whereby its pressure side is communicating via a three-way valve, with a pressure pipe, as well as, with the suction side of the pump of a second wind machine.

7. A wind machine according to claim 5 whereby the pressurized water drives a pelton wheel.

8. A wind machine according to claim 7 whereby the pelton wheel drives an air compressor providing compressed air to a compressed air container which can be discharged by an expander-motor.

9. A wind machine according to claim 8 whereby the compressor comprises several stages of equal compression ratio and whereby between the outlet of a stage and the inlet of the next stage a heat exchanger is inserted extracting the compression heat and storing this heat in a heat storage.

10. A wind machine according to claim 9 whereby the heat storage forms a floating container.

11. A wind machine according to claim 9 whereby the container for compressed air is placed at the bottom of a deep water body.

12. A wind machine according to claim 11 whereby the wall structure of the compressed air container is made of flexible material.

* * * * *